(12) United States Patent
Watanabe et al.

(10) Patent No.: US 9,213,195 B2
(45) Date of Patent: Dec. 15, 2015

(54) DISPLAY DEVICE

(75) Inventors: Noriko Watanabe, Osaka (JP); Takuto Yasumatsu, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 186 days.

(21) Appl. No.: 13/703,157

(22) PCT Filed: Apr. 26, 2011

(86) PCT No.: PCT/JP2011/002449
§ 371 (c)(1),
(2), (4) Date: Dec. 10, 2012

(87) PCT Pub. No.: WO2011/155117
PCT Pub. Date: Dec. 15, 2011

(65) Prior Publication Data
US 2013/0088662 A1   Apr. 11, 2013

(30) Foreign Application Priority Data
Jun. 9, 2010 (JP) .................. 2010-132409

(51) Int. Cl.
G02F 1/1333 (2006.01)
G09F 9/30 (2006.01)
(52) U.S. Cl.
CPC ........ *G02F 1/1333* (2013.01); *G02F 1/133308* (2013.01); *G09F 9/301* (2013.01); *G02F 1/133305* (2013.01); *G02F 2001/133317* (2013.01); *G02F 2001/133388* (2013.01); *G02F 2201/54* (2013.01)

(58) Field of Classification Search
CPC ............... G02F 1/133308; G02F 1/133305; G02F 2001/133317
USPC ....................................... 349/58–60
See application file for complete search history.

(56) References Cited

U.S. PATENT DOCUMENTS

| | | | |
|---|---|---|---|
| 6,172,731 B1 * | 1/2001 | Nagano et al. | 349/150 |
| 7,292,290 B2 * | 11/2007 | Miyagawa et al. | 349/58 |
| 2006/0133018 A1 | 6/2006 | Okuda | |
| 2009/0201443 A1 | 8/2009 | Sasaki et al. | |
| 2009/0290089 A1 * | 11/2009 | Ichioka et al. | 349/58 |
| 2010/0327737 A1 | 12/2010 | Hayashi et al. | |

FOREIGN PATENT DOCUMENTS

| | | |
|---|---|---|
| JP | 6-67164 | 3/1994 |
| JP | 2006-154366 | 6/2006 |
| JP | 2006-243621 | 9/2006 |

(Continued)

OTHER PUBLICATIONS

International Search Report for PCT/JP2011/002449 mailed Jun. 21, 2011.

(Continued)

*Primary Examiner* — Richard Kim
*Assistant Examiner* — Kendrick Hsu
(74) *Attorney, Agent, or Firm* — Nixon & Vanderhye, P.C.

(57) ABSTRACT

A display device (50*aa*) includes a display panel (30) which has a display region (D) for image display and a non-display region (N) surrounding the display region (D), and has flexibility, wherein a reinforcing member (35*a*) is bonded to in the non-display region (N) of the display panel (30) such that the display region (D) is exposed.

7 Claims, 4 Drawing Sheets

(56) References Cited

FOREIGN PATENT DOCUMENTS

| JP | 2006-267159 | 10/2006 |
|----|-------------|---------|
| JP | 2006-330082 | 12/2006 |
| JP | 2009-042565 | 2/2009 |
| JP | 2010-145731 | 7/2010 |
| JP | 2011-7904 | 1/2011 |

OTHER PUBLICATIONS

Written Opinion of the International Searching Authority mailed Jun. 21, 2011.

* cited by examiner

DISPLAY DEVICE

This application is the U.S. national phase of International Application No. PCT/JP2011/002449 filed 26 Apr. 2011 which designated the U.S. and claims priority to JP 2010-132409 filed 9 Jun. 2010, the entire contents of each of which are hereby incorporated by reference.

TECHNICAL FIELD

The present invention relates to display devices, and specifically to a display device including a display panel which has a flexible substrate and flexibility.

BACKGROUND ART

Display devices such as liquid crystal display devices generally include display panels having glass substrates, and thus may be damaged by external impact.

For example, Patent Document 1 discloses a display device including a display panel having a pair of glass substrates, a metal upper frame disposed above the display panel to store the display panel, and a buffer member made of a foamed material and disposed between the upper frame and an upper surface of one of the glass substrates included in the display panel. Patent Document 1 describes that this configuration can reduce damage on the display panel caused by impact, such as dropping impact.

CITATION LIST

Patent Document

PATENT DOCUMENT 1: Japanese Patent Publication No. 2006-154366

SUMMARY OF THE INVENTION

Technical Problem

In recent years, for example, display panels such as liquid crystal display panels including flexible substrates such as plastic substrates, instead of conventionally used glass substrates, and having flexibility have been developed in order to adjust the shape of the panels to the surface shape of installation locations, or to improve designability.

However, when substrate materials of the display panels having the flexible substrates and having flexibility are softer and thinner, the display panels have lower stiffness, and thus are more easily bent. In this case, handling the substrates (and display panels including the substrates) may become difficult, cracks may be developed in inorganic insulating films or metal conductive films on the substrates when the panels are bent beyond an allowable range, or panel structures may be broken.

In view of the foregoing, the present invention was devised. It is an objective of the present invention to provide a display device which includes a display panel having flexibility, and exhibits both flatness and flexibility.

Solution to the Problem

To achieve the objective, the present invention includes a reinforcing member bonded to a non-display region of a display panel such that a display region is exposed.

Specifically, a display device according to the present invention is a display device including: a display panel which includes a display region for image display and a non-display region surrounding the display region, and has flexibility, wherein a reinforcing member is bonded to the non-display region of the display panel such that the display region is exposed.

With this configuration, the reinforcing member is bonded to the non-display region of the display panel such that the display region is exposed. Thus, the flatness of the display panel having flexibility is ensured by the stiffness of the reinforcing member. Moreover, the reinforcing member having stiffness is not bonded to the display region (which occupies most of the area) of the display panel, and thus the flexibility of the display panel can be maintained compared to, for example, the case where the reinforcing member is bonded to the entire area of the panel. Thus, the display device including a display panel having flexibility can exhibit both flatness and flexibility.

The display region may have a rectangular shape, and the reinforcing member may have a frame shape.

With this configuration, the reinforcing member has a frame shape form to expose the rectangular display region of the display panel. The reinforcing member having the frame shape allows the display panel to exhibit both flatness and flexibility.

The display region may have a rectangular shape, a terminal region may be defined in at least one edge area of the non-display region, and the reinforcing member may be provided on three edge areas of the non-display region which include the edge area in which the terminal region is defined.

With this configuration, the terminal region is defined in at least one edge area of the non-display region surrounding the rectangular display region of the display panel, and the reinforcing member is provided on three edge areas of the non-display region which include the edge area in which the terminal region is defined. Thus, the reinforcing member provided on the three edge areas including the edge area which has to have stiffness for pressure bonding mounted components, and in which the terminal region is defined allows the display panel to exhibit both flatness and flexibility. Moreover, the weight of the display device is reduced because the area to which the reinforcing member is bonded is small compared to a frame-shaped reinforcing member.

The reinforcing member may have a relatively large thickness on the edge area in which the terminal region is defined.

With this configuration, the reinforcing member has a relatively large thickness on the edge area in which the terminal region is defined in the non-display region of the display panel. Thus, even when mounted components are pressure-bonded to the terminal region of the non-display region of the display panel, the flatness of the display panel becomes easy to be maintained, so that breaks in the line provided in the terminal region is reduced.

The reinforcing member may include reinforcing members separately provided on a front surface and a back surface of the non-display region.

With this configuration, the reinforcing member includes reinforcing members separately provided on the front surface and the back surface of the non-display region. Thus, for example, in the edge area in which the terminal region is defined in the non-display region of the display panel, a reinforcing member having a relatively large thickness is provided on the back surface of the display panel, and in the edge areas in which the terminal region is not defined in the non-display region of the display panel, a reinforcing member having a relatively small thickness is provided on the front surface of the display panel. This simplifies the shape of components of the reinforcing member.

The display panel may be a liquid crystal display panel.

With this configuration, the display panel is a liquid crystal display panel. Thus, a liquid crystal display device including a liquid crystal display panel having a flexible substrate can exhibit both flatness and flexibility.

The display panel and the reinforcing member may be curved in one direction.

With this configuration, the display panel and the reinforcing member are curved in one direction. Thus, operation and advantages of the present invention that both flatness and flexibility are exhibited are effectively achieved, which improves designability of display panels and display devices including the display panels.

The reinforcing member may have a lower coefficient of thermal expansion than a flexible substrate included in the display panel.

With this configuration, the coefficient of thermal expansion (line expansion coefficient) of the reinforcing member is smaller than the coefficient of thermal expansion (line expansion coefficient) of a flexible substrate included in the display panel. Thus, the flatness of the display panel having a relatively large coefficient of thermal expansion is ensured by the reinforcing member having a relatively small coefficient of thermal expansion. For example, expansion of the display panel in pressure bonding mounted components at a high temperature is reduced, and thus precise pressure bonding (mounting) is possible.

Advantages of the Invention

According to the present invention, the reinforcing member is bonded to the non-display region of the display panel such that the display region is exposed, so that the display device including the display panel having flexibility can exhibit both flatness and flexibility.

DESCRIPTION OF EMBODIMENTS

Embodiments of the present invention will be described in detail below with reference to the drawings. The present invention is not limited to the embodiments below.

First Embodiment of the Invention

Figure 1:
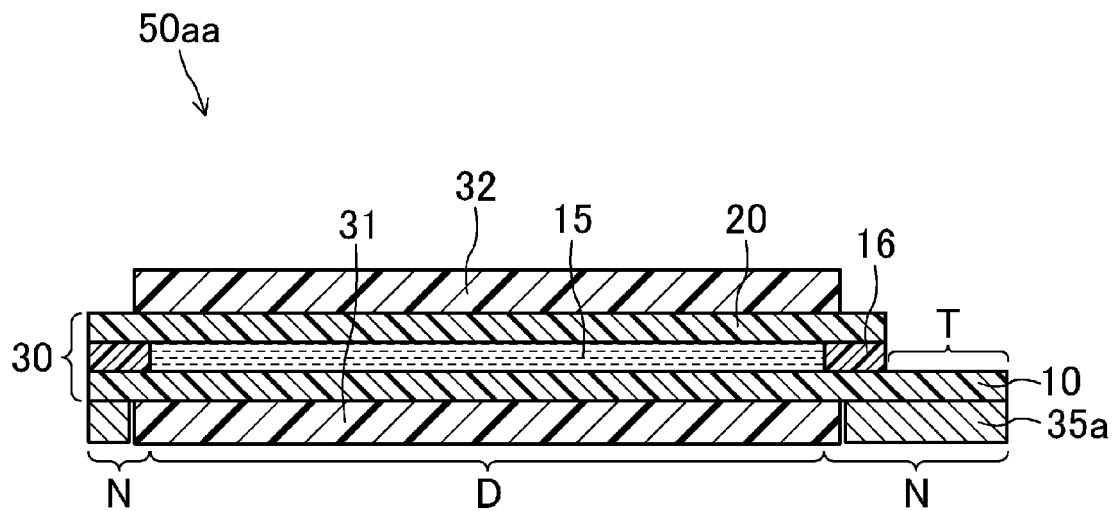
FIG. 1 is a cross-sectional view illustrating a liquid crystal display device according to a first embodiment.
Figure 2:
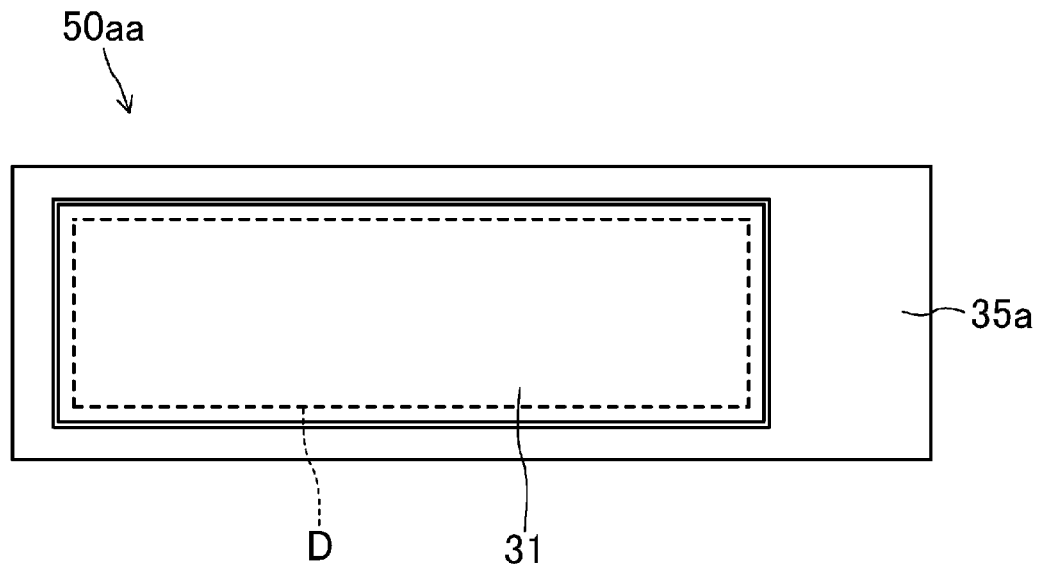
FIG. 2 is a plan view illustrating the liquid crystal display device according to the first embodiment.
Figure 3:
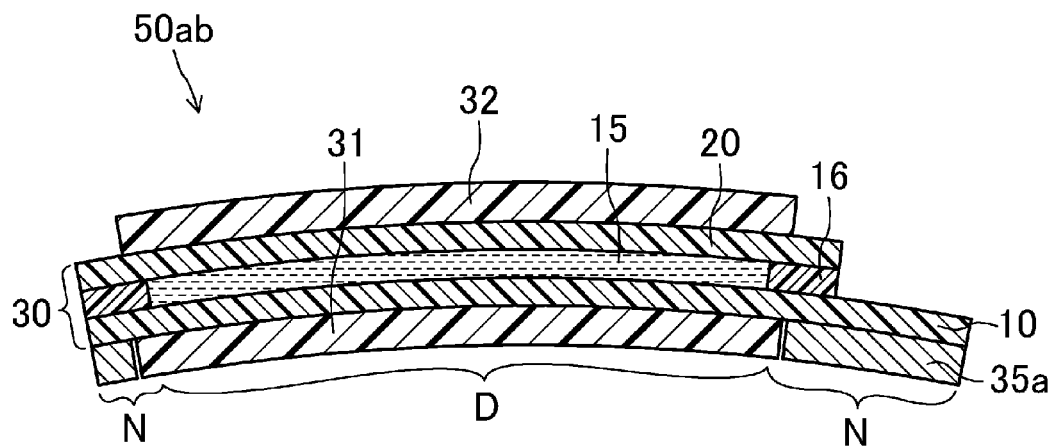
FIG. 3 is a cross-sectional view illustrating another liquid crystal display device according to the first embodiment.
Figure 4:
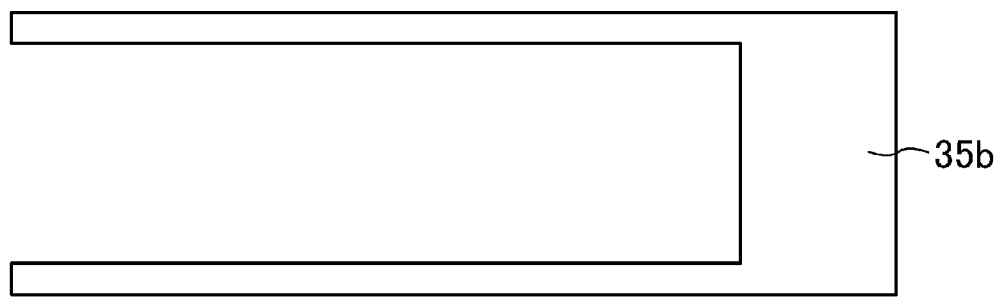
FIG. 4 is a plan view illustrating a first variation of a reinforcing member included in the liquid crystal display device according to the first embodiment.
Figure 5:
FIG. 5 is a plan view illustrating a second variation of the reinforcing member included in the liquid crystal display device according to the first embodiment.
Figure 6:
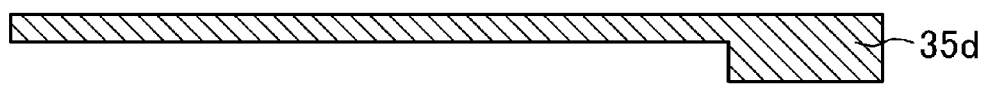
FIG. 6 is a cross-sectional view illustrating a third variation of the reinforcing member included in the liquid crystal display device according to the first embodiment.
Figure 7:
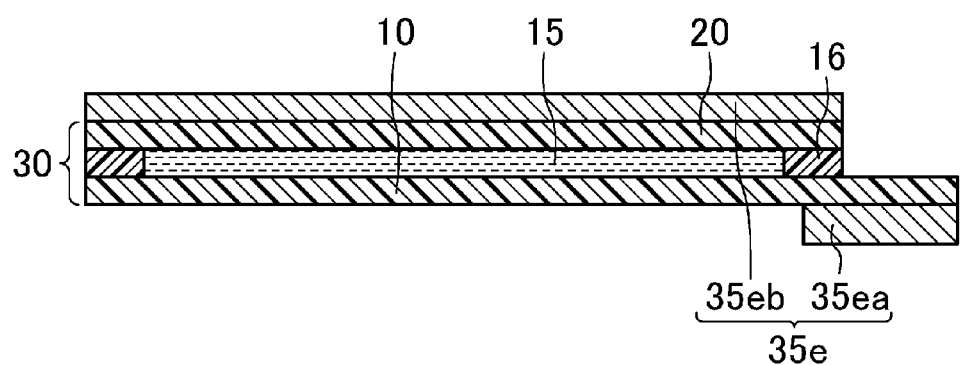
FIG. 7 is a cross-sectional view illustrating a fourth variation of the reinforcing member included in the liquid crystal display device according to according to the first embodiment.

FIGS. 1-7 illustrate a first embodiment of a display device according to the present invention. Specifically, FIG. 1 is a cross-sectional view illustrating a liquid crystal display device 50aa of the present embodiment, and FIG. 2 is a plan view illustrating the liquid crystal display device 50aa, viewed from the back surface (from the bottom in FIG. 1). Moreover, FIG. 3 is a cross-sectional view of a liquid crystal display device 50ab of the present embodiment. Further, FIG. 4 is a plan view illustrating a reinforcing member 35b included in the liquid crystal display device of the present embodiment, and FIG. 5 is a plan view illustrating a reinforcing member 35c included in the liquid crystal display device of the present embodiment. Furthermore, FIG. 6 is a cross-sectional view illustrating a reinforcing member 35d included in the liquid crystal display device of the present embodiment, and FIG. 7 is a cross-sectional view illustrating a reinforcing member 35e included in the liquid crystal display device of the present embodiment, and a liquid crystal display panel 30a to which the reinforcing member 35e is bonded.

As illustrated in FIG. 1, the liquid crystal display device 50aa includes: a liquid crystal display panel 30 which includes a rectangular display region D (see FIG. 2) and a frame-shaped non-display region N surrounding the display region D, has flexibility; polarizing plates 31 and 32 respectively bonded to a back surface (lower surface in the figure) and a front surface (upper surface in the figure) of the liquid crystal display panel 30; and a reinforcing member 35a bonded to the back surface of the liquid crystal display panel 30 in the non-display region N. Here, in the display region D, a plurality of pixels each of which is a minimum unit of an image are arranged in a matrix.

As illustrated in FIG. 1, the liquid crystal display panel 30 includes: a TFT substrate 10 including thin film transistors (hereinafter also referred to as "TFTs") each provided to the pixel, and the like; a color filter substrate 20 disposed to face the TFT substrate 10, and including a color filter (hereinafter also referred to as "CF") layer, and the like; a liquid crystal layer 15 disposed between the TFT substrate 10 and the CF substrate 20; and a sealing material 16 which adheres the TFT substrate 10 to the CF substrate 20, and with which the liquid crystal layer 15 is sealed between the substrates 10 and 20.

The TFT substrate 10 includes: for example, a plurality of gate lines (not shown) disposed to extend parallel to each other on a flexible substrate which is a plastic substrate made of, for example, polyether sulphone (PES, coefficients of thermal expansion: about 56 ppm/° C.), polyethylene terephthalate (PET), polyimide (PI, coefficients of thermal expansion: about 5 ppm/° C.), etc. or a composite substrate made of the plastic substrate and glass fibers, glass cloth, etc.; a gate insulating film (not shown) disposed to cover the gate lines; a plurality of source lines (not shown) disposed on the gate insulating film to extend parallel to each other in a direction orthogonal to the gate lines; a plurality of TFTs (not shown) each provided at a corresponding one of intersections of the gate lines and the source lines; a plurality of pixel electrodes (not shown) which are arranged in a matrix on an interlayer insulating film (not shown) covering the TFTs and the source lines, and are connected to the TFTs; and an alignment layer (not shown) provided to cover the pixel electrodes. Here, as illustrated in FIG. 1, at one side of the non-display region N, an edge area of the non-display region N of the TFT substrate 10 protrudes beyond the CF substrate 20, thereby forming a terminal region T.

The CF substrate 20 includes, for example: a black matrix (not shown) which is in the shape of a frame (in the non-display region N) on the above-described flexible substrate, and has a grid in the frame (display region D); a CF layer (not shown) including a red color layer, a green color layer, a blue color layer, etc. provided in apertures of the black matrix; a common electrode (not shown) provided to cover the black matrix and the CF layer; a photo spacer (not shown) provided on the common electrode and having a columnar shape; and an alignment layer (not shown) provided to cover the common electrode.

The liquid crystal layer 15 is made of, for example, a nematic liquid crystal material having electro-optical characteristics.

As illustrated in FIGS. 1 and 2, the reinforcing member 35a is formed in the non-display region N of the liquid crystal display panel 30 to have a frame shape so that the display region D is exposed via the polarizing plate 31. Here, the reinforcing member 35a is made of, for example, metal such as aluminum (coefficients of thermal expansion: about 23 ppm/° C.), magnesium (coefficients of thermal expansion: about 27 ppm/° C.), stainless steel, etc., or plastic resistant to a heat temperature of 150° C. or higher. Moreover, the reinforcing member 35a has to have a larger thickness than the liquid crystal display panel 30 to exhibit suitable stiffness and flatness, and has a thickness of, for example, about tens of micrometers to 200 micrometers. Alternatively, as illustrated in FIGS. 4 and 5, the reinforcing member 35a may be a reinforcing member 35b or 35c which is provided on three edge areas (upper, lower, and right edge areas in FIG. 4, or upper, left, and right edge areas in FIG. 5) including an edge area in which the terminal region T is defined in the non-display region N of the liquid crystal display panel 30. Alternatively, as illustrated in FIG. 6, the reinforcing member 35a may be a reinforcing member 35d which has a relatively large thickness on an edge area in which the terminal region T is defined. Alternatively, as illustrated in FIG. 7, the reinforcing member 35a may be a reinforcing member 35e including: a first reinforcing member 35ea which has a strip shape, and is formed on the back surface of the liquid crystal display panel 30 in the non-display region N to have a relatively large thickness in the edge area in which the terminal region T is defined; and a second reinforcing member 35eb which has a C shape (substantially U shape), and is formed on the front surface of the liquid crystal display panel 30 in the non-display region N to have a relatively small thickness in the three edge areas in which the terminal region T is not defined. Moreover, the coefficient of thermal expansion of each of the reinforcing members 35a-35e is preferably smaller than the coefficient of thermal expansion of the flexible substrate included in the liquid crystal display panel 30 (the TFT substrate 10 and the CF substrate 20).

The liquid crystal display device 50aa having the above-described configuration is configured such that voltages each of which is predetermined for an associated one of pixels are applied to the liquid crystal layer 15 disposed between the pixel electrodes on the TFT substrate 10 and the common electrode on the CF substrate 20 to change the alignment of the liquid crystal layer 15, thereby adjusting transmittance of light penetrating through the panel for each pixel to display an image.

The liquid crystal display device 50aa having the above-described configuration may be a liquid crystal display device 50ab in which, as illustrated in FIG. 3, the liquid crystal display panel 30 and the reinforcing member 35a are curved in one direction by, for example, being deformed along a surrounding wall of a columnar structure so that the CF substrate 20 is outwardly curved. Note that the present embodiment has illustrated the liquid crystal display device 50ab in which the CF substrate 20 are outwardly curved, but the TFT substrate 10 of the liquid crystal display device may be outwardly curved.

Next, a method for manufacturing a liquid crystal display device 50aa of the present embodiment will be described. Here, the manufacturing method in the present embodiment includes a liquid crystal display panel fabricating step, and a reinforcing member bonding step.

<Liquid Crystal Display Panel Fabricating Step>

First, for example, a flexible substrate having a thickness of about 20 nm is bonded to a glass substrate having a thickness of about 0.7 mm. Then, on the flexible substrate, gate lines, source lines, TFTs, pixel electrodes, an alignment layer, etc. are formed by a known method, thereby forming a TFT substrate 10 on the glass substrate.

Moreover, for example, a flexible substrate having a thickness of about 20 nm is bonded to a glass substrate having a thickness of about 0.7 mm. Then, on the flexible substrate, a black matrix, a CF layer, a common electrode, a photo spacer, and an alignment layer are formed by a known method, thereby forming a CF substrate 20 on the glass substrate.

Subsequently, a sealing material 16 made of epoxy resin, or the like is formed, for example, by using a dispenser to have a frame shape in a non-display region N of the CF substrate 20 on the glass substrate.

Then, for example, on the CF substrate 20 provided with the sealing material 16, a liquid crystal material (15) is dropped by using a dispenser onto a display region D surrounded by the sealing material 16.

Moreover, the CF substrate 20 which has been formed on the glass substrate and on which the liquid crystal material (15) has been dropped and the TFT substrate 10 on the glass substrate are bonded to each other under reduced pressure, and then are released to air pressure, thereby applying pressure to the glass substrates of the TFT substrate 10 and the CF substrate 20 to form a bonded body.

Finally, the sealing material 16 held in the bonded body is cured to seal a liquid crystal layer 15 between the TFT substrate 10 and the CF substrate 20, and then the glass substrates are removed from the bonded body.

Thus, a liquid crystal display panel 30 can be fabricated.

<Reinforcing Member Bonding Step>

After polarizing plates 31 and 32 are bonded to a back surface and a front surface of the liquid crystal display panel 30 formed in the liquid crystal display panel fabricating step, a reinforcing member 35a is bonded to the back surface of the liquid crystal display panel 30 in the non-display region N by an adhesive such as epoxy resin. Here, the adhesive is preferably resistant to a high temperature in pressure bonding mounted components to the terminal region T, and is resistant to, for example, a temperature of 150° C. or higher, preferably resistant to a high temperature of 250° C. or higher.

Thus, the liquid crystal display device 50aa can be manufactured.

As described above, in the liquid crystal display device 50aa of the present embodiment, the frame-shaped reinforcing member 35a is bonded to the liquid crystal display panel 30 in the non-display region N such that the display region D is exposed. Thus, the flatness of the liquid crystal display panel 30 having flexibility can be ensured by the stiffness of the reinforcing member 35a. Moreover, the reinforcing member 35a having stiffness is not bonded to the display region D occupying most of the area of the liquid crystal display panel 30, so that compared to the case where, for example, a reinforcing member is bonded to the entire surface of the panel, the flexibility of the liquid crystal display panel 30 can be maintained. Thus, the liquid crystal display device 50aa including the liquid crystal display panel 30 having flexibility can exhibit both flatness and flexibility.

Moreover, in the liquid crystal display device 50aa of the present embodiment, the flatness of the liquid crystal display panel 30 can be ensured by the stiffness of the reinforcing member 35a, so that the liquid crystal display panel 30 and the liquid crystal display device 50aa can be easily handled.

Moreover, in the liquid crystal display device 50aa of the present embodiment, the flatness of the liquid crystal display panel 30 having a relatively high coefficient of thermal expansion can be ensured by the reinforcing member 35a having a relatively low coefficient of thermal expansion. Thus, it is possible to reduce expansion of the liquid crystal display panel 30 in pressure bonding mounted components at a high temperature, and thus precise pressure bonding (mounting) is possible.

Moreover, in the liquid crystal display device including the reinforcing member 35b or 35c of the present embodiment, the terminal region T is defined in one edge area of the non-display region N surrounding the rectangular display region D of the liquid crystal display panel 30, and the reinforcing member 35b or 35c is provided on three edge areas of the non-display region N including the edge area in which the terminal region T is defined. Thus, the reinforcing member 35b or 35c provided on the three edge areas including the edge area in which the terminal region T is defined and which has to have stiffness for pressure bonding mounted components allows the liquid crystal panel 30 to exhibit both flatness and flexibility. Moreover, the weight of the liquid crystal display device can be reduced because the area to which the reinforcing member is bonded is small compared to the frame-shaped reinforcing member (see the reinforcing member 35a).

Moreover, in the liquid crystal display device including the reinforcing member 35d of the present embodiment, the reinforcing member 35d has a relatively large thickness on an edge area in which the terminal region T is defined in the non-display region N of the liquid crystal display panel 30. Thus, even when mounted components are pressure-bonded to the terminal region T of the non-display region N of the liquid crystal display panel 30, the flatness of the liquid crystal display panel 30 becomes easy to be maintained, and breaks in a line provided in the terminal region T can be reduced.

Moreover, in the liquid crystal display device including the reinforcing member 35e of the present embodiment, the reinforcing member 35e includes reinforcing members provided on the front surface and on the back surface of the liquid crystal display panel 30 in the non-display region N. That is, in an edge area in which the terminal region T is defined in the non-display region N of the liquid crystal display panel 30, the first reinforcing member 35ea which has a relatively large thickness and a strip shape is provided on the back surface of the liquid crystal display panel 30, and in three edge areas in which the terminal region T is not defined in the non-display region N of the liquid crystal display panel 30, the second reinforcing member 35eb which has a relatively small thickness and has a C shape is provided on the front surface of the liquid crystal display panel 30. Thus, the shape of components included in the reinforcing member 35e can be simplified.

Moreover, in the liquid crystal display device 50ab of the present embodiment, the liquid crystal display panel 30 and the reinforcing member 35a are curved in one direction. Thus, it is possible to adjust the shape of the liquid crystal display panel 30 to the surface shape of an installation location, or to improve designability of the liquid crystal display panel 30 and the liquid crystal display device 50ab including the liquid crystal display panel 30.

Second Embodiment of the Invention

Figure 8:
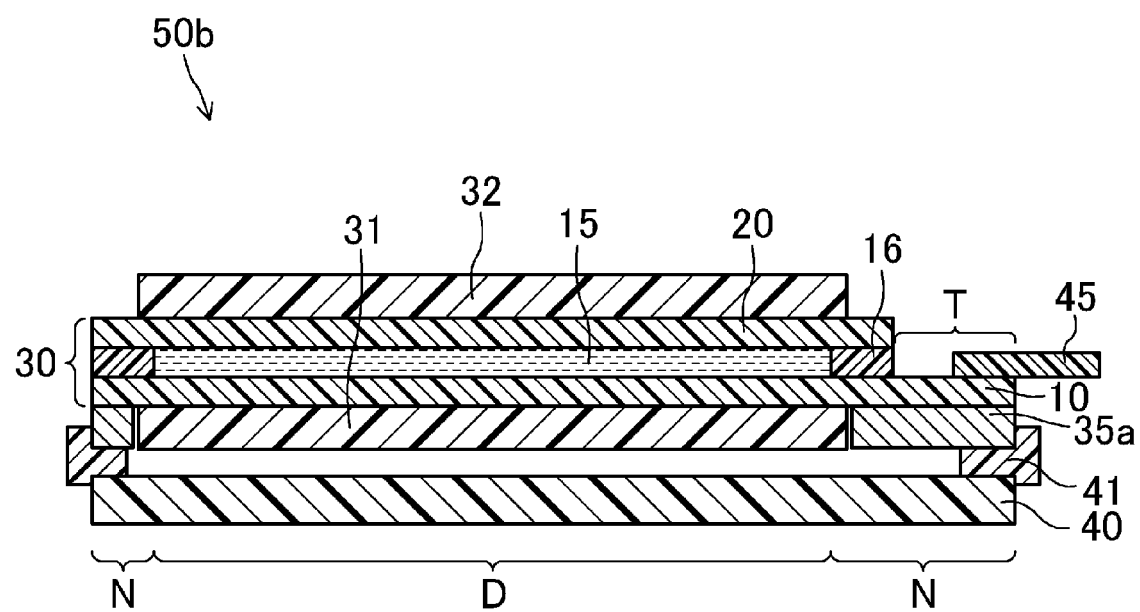
FIG. 8 is a cross-sectional view illustrating a liquid crystal display device according to a second embodiment.

FIG. 8 is a cross-sectional view illustrating a liquid crystal display device 50b of the present embodiment. Note that in the following embodiment, the same reference numerals as those shown in FIGS. 1-7 are used to represent equivalent elements, and the explanation thereof will be omitted.

The first embodiment has illustrated the liquid crystal display devices 50aa and 50ab in which configurations of a backlight unit and a mounted member are omitted. The present embodiment specifically illustrates a liquid crystal display device 50b to which a backlight unit is provided, and a mounted member is pressure-bonded.

As illustrated in FIG. 8, The liquid crystal display device 50b includes a liquid crystal display panel 30, polarizing plates 31 and 32 respectively bonded to a back surface (a lower surface in the figure) and a front surface (an upper surface in the figure) of the liquid crystal display panel 30, a reinforcing member 35a bonded to the liquid crystal display panel 30 in a non-display region N, a backlight unit 40 provided on the back surface of the liquid crystal display panel 30 with an attachment member 41 made of plastic interposed between the back surface and the backlight unit 40, and a flexible printed circuit (FPC) 45 serving as a mounted member and pressure-bonded to a terminal region T of the non-display region N of the liquid crystal display panel 30.

The liquid crystal display device 50b having the configuration described above can be manufactured by pressure-bonding the FPC 45 to the terminal region T of the liquid crystal display device 50aa of the first embodiment via an anisotropic conductive film (ACF), and then attaching the backlight unit 40 to the reinforcing member 35a via the attachment member 41.

As described above, in the same manner as in the first embodiment, the liquid crystal display device 50b of the present embodiment includes the reinforcing member 35a which has a frame shape and is bonded to the non-display region N of the liquid crystal display panel 30 so that the display region D is exposed. Thus, the liquid crystal display device 50b including the liquid crystal display panel 30 having flexibility can exhibit both flatness and flexibility.

Moreover, in the liquid crystal display device 50b of the present embodiment, the flatness of the liquid crystal display panel 30 can be ensured by the stiffness of the reinforcing member 35a. Thus, it is possible to keep a certain distance between the liquid crystal display panel 30 and the backlight unit 40, and thus excellent optical properties can be obtained.

Although the embodiments described above have illustrated a liquid crystal display device including a liquid crystal display panel as a display device, the present invention is applicable to, for example, other display devices such as organic electro luminescence (EL) display devices.

Moreover, the embodiments described above have illustrated a nematic liquid crystal layer, but the liquid crystal layer may be cholesteric or smectic.

Moreover, the embodiments described above have illustrated a columnar photo spacer as a spacer to define the thickness of the liquid crystal layer, but a particulate spacer may be used.

Moreover, the embodiments described above have illustrated a single panel manufacturing process in which a flexible substrate is bonded to a glass substrate as a method for manufacturing a liquid crystal display device, but for example, a roll-to-roll manufacturing process may be used.

Moreover, the embodiments described above have illustrated a manufacturing method in which a one drop fill (ODF) method is used as a method for fabricating manufacturing a liquid crystal display device. However, for example, a manufacturing method in which an empty cell is formed under normal pressure, and then a liquid crystal material is injected between substrates of the empty cell by a vacuum injection method may be used.

INDUSTRIAL APPLICABILITY

As described above, the present invention allows a display device including a display panel having flexibility to exhibit both flatness and flexibility. Thus, the present invention is useful not only for flat display devices, but also for curved display devices.

DESCRIPTION OF REFERENCE CHARACTERS

D Display Region
N Non-Display Region
T Terminal Region
30 Liquid Crystal Display Panel
35a-35e Reinforcing Member
50aa, 50ab, 50b Liquid Crystal Display Device

The invention claimed is:

1. A display device comprising:
a display panel which includes a display region for image display and a non-display region surrounding the display region, and has flexibility, wherein
a reinforcing member bonded to the non-display region of the display panel such that the display region is exposed;
the display region having a rectangular shape,
a terminal region is defined in one edge area of the non-display region,
the reinforcing member comprises:
a first reinforcing members provided on a back surface of the non-display region and having a strip shape in an edge area in which the terminal region is defined;
a second reinforcing member separately provided on a front surface of the non-display region, the second reinforcing member being provided on a front surface of the non-display region and having a substantially U shape when viewed in plan in three edge areas in which the terminal region is not defined,
the display panel includes a first substrate comprising the terminal region, and a second substrate facing the first substrate,
the terminal region corresponds to a region of a first surface of the first substrate protruding beyond the second substrate, the first surface facing the second substrate,
the first reinforcing member is bonded to a second surface of the first substrate facing away from the second substrate, and
the second reinforcing member is bonded to a surface of the second substrate facing away from the first substrate.

2. The display device of claim 1, wherein the display panel is a liquid crystal display panel.

3. The display device of claim 1, wherein the display panel and the reinforcing member are curved in one direction.

4. The display device of claim 1, wherein the reinforcing member has a lower coefficient of thermal expansion than a flexible substrate included in the display panel.

5. The display device of claim 1, wherein the reinforcing member has a larger thickness than the display panel.

6. The display device of claim 1, wherein the reinforcing member has a thickness in a range from about tens of micrometers to 200 micrometers.

7. The display device of claim 1, wherein a first of the reinforcing members has a greater thickness than the second of the reinforcing members.

* * * * *